(12) United States Patent
Choudhery

(10) Patent No.: US 8,791,204 B2
(45) Date of Patent: Jul. 29, 2014

(54) POLYMER DISPERSIONS OF NARROW PARTICLE SIZE DISTRIBUTION

(75) Inventor: Riaz Ahmad Choudhery, Solihull (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 416 days.

(21) Appl. No.: 13/127,562

(22) PCT Filed: Nov. 10, 2009

(86) PCT No.: PCT/EP2009/064868
§ 371 (c)(1),
(2), (4) Date: Jul. 20, 2011

(87) PCT Pub. No.: WO2010/055019
PCT Pub. Date: May 20, 2010

(65) Prior Publication Data
US 2011/0288205 A1    Nov. 24, 2011

(30) Foreign Application Priority Data

Nov. 12, 2008   (EP) ..................................... 08019750

(51) Int. Cl.
| | | |
|---|---|---|
| *C09D 151/06* | (2006.01) | |
| *C09D 133/14* | (2006.01) | |
| *C09D 163/00* | (2006.01) | |
| *C08J 3/11* | (2006.01) | |
| *C08J 3/24* | (2006.01) | |
| *C08F 8/46* | (2006.01) | |
| *C08F 10/06* | (2006.01) | |

(52) U.S. Cl.
CPC .. *C08J 3/11* (2013.01); *C08J 3/246* (2013.01); *C08F 8/46* (2013.01); *C08F 10/06* (2013.01)
USPC ............................. 525/119; 525/120; 525/123

(58) Field of Classification Search
CPC .............. C08J 3/11; C08J 3/246; C08F 8/46; C08F 10/06
USPC .......................................... 525/119, 120, 123
See application file for complete search history.

(56) References Cited

U.S. PATENT DOCUMENTS

| | | |
|---|---|---|
| 3,375,300 A | 3/1968 | Ropp |
| 4,156,672 A | 5/1979 | Fitko et al. |
| 4,312,902 A | 1/1982 | Murase et al. |
| 6,833,045 B1 | 12/2004 | Tokita et al. |
| 8,093,334 B2 * | 1/2012 | Choudhery et al. ........... 525/119 |

FOREIGN PATENT DOCUMENTS

| | | |
|---|---|---|
| EP | 1 457 513 | 9/2004 |
| WO | 2008/135223 | 11/2008 |

OTHER PUBLICATIONS

Extended European Search Report for EP Application No. 08019750. 2, dated May 8, 2009, 6 pages.

* cited by examiner

*Primary Examiner* — Mark Kaucher
(74) *Attorney, Agent, or Firm* — Kenyon & Kenyon LLP

(57) ABSTRACT

A process for the manufacture of a polymer dispersion from a mixture of a first polypropylene polymer having sufficient carboxylic acid and/or carboxylic acid anhydride groups equivalent to an acid value of from 2 to 50 mg KOH/g nv polymer and a second polymer having a molar excess of functional groups capable of reacting with the carboxylic acid and/or carboxylic acid anhydride groups of the polypropylene is provided. Also provided herein are polypropylene dispersions in organic carrier liquid prepared by such method, as well as coating compositions comprising the dispersion and articles coated with the coating composition.

20 Claims, No Drawings

POLYMER DISPERSIONS OF NARROW PARTICLE SIZE DISTRIBUTION

REFERENCE TO RELATED APPLICATION(s)

This application is the U.S. National Phase of PCT/EP2009/064868 filed on Nov. 10, 2009, and claims the benefit of EP Application No. 08019750.2, filed on Nov. 12, 2008.

This invention relates to polymer dispersions comprising, in particular, modified polypropylene dispersions in organic carrier liquid, useful as coating compositions especially for use for metal food and drinks containers and in heat seal applications for containers. There is also provided a process for making the dispersions.

Metal food and drink containers, for example cans and lidded trays, are usually coated on the inside to prevent reaction between the contents and the metal from which the can is formed. Such reaction leads both to unwanted deterioration of the can and also potentially damaging effects on the contents, particularly in terms of changes in quality and taste. Without an interior coating, most cans of food or drink would not remain usable for very long. The coating is often applied to the flat metal by roller coating before the can is formed and then dried and/or cured in a stoving operation. Typical oven temperatures used are about 200° C. for 6 to 12 minutes for sheet metal and about 200° C. for 8-30 seconds for coil metal. The can is then formed from the flat metal by a drawing process before being filled with food or drink and finally sealed up.

The coatings are required to have very good flexibility, adhesion, sterilisation resistance, stability properties and blush resistance. Flexibility and adhesion are essential if the coating is to remain intact during the can formation process when the coated flat metal sheet is drawn into the form of the can.

When the cans are filled with food, the contents are usually sterilised by heating the sealed can to temperatures of around 120° C. to 140° C. for 10 to 90 minutes (depending on the nature of the food). The coating is then in direct contact with the contents of the can for a considerable period of time which can be many years. During sterilisation and subsequent storage, the coating is required to maintain its integrity so as to prevent corrosion of the metal can and to prevent metal migration into the can contents. Additionally, the coating must not impair the contents by releasing unwanted material or by altering the flavour or appearance. These resistance properties impact not only on the shelf life of the product but also on public health and safety. Thus, there are particularly stringent and specific requirements of coating compositions for can interiors which are different from those for other coatings.

In some applications the coating is also used to bond the lid to the container body. For example, pet food can be provided in a tray with a thin, full length aluminium lid. The lid is attached to the tray by means of a coating, usually crosslinked, which on application of heat and pressure forms an adhesive bond or seal between the lid and the tray. The contents are accessed by simply peeling back the flexible aluminium lid which in turn breaks the seal. The strength of the seal is very important as it must be strong enough to survive the manufacturing and filling process, yet not be so strong that breaking the seal becomes difficult.

In many applications the coatings are applied as very thin films to produce dried films of no more than 10 μm thickness. In such circumstances the coatings must be free of particulate matter greater than this size.

Polymers dispersions are often used to formulate coatings. Unfortunately, these can contain particles too large to be suitable for use in applications requiring very thin films. Coatings derived from such dispersions are uneven producing not only rough surfaces but also problems in properties such as adhesion and protective properties.

Thus there is a need for an improved process for the manufacture of polymer dispersions of small particle size and narrow particle size distribution.

Accordingly, in a first aspect of the invention there is provided a process for the manufacture of a polymer dispersion comprising the steps of i) providing a mixture comprising from 2 to 60 parts by weight of a first polypropylene polymer having sufficient carboxylic acid and/or carboxylic acid anhydride groups equivalent to an acid value of from 2 to 50 mg KOH/g nv polymer and from 40 to 98 parts by weight of a second polymer having a molar excess of functional groups capable of reacting with the carboxylic acid and/or carboxylic acid anhydride groups of the polypropylene ii) causing the polymers to melt at a chosen temperature under conditions of high shear in an extruder to form an intimate mixture of the polymers iii) causing some of the carboxylic acid and/or carboxylic acid anhydride groups of the polypropylene to react with at least some of the functional groups of the second polymer to form a reaction mixture, under conditions of high shear in an extruder iv) rapidly cooling the reaction mixture outside the extruder to form a solid product v) optionally breaking up the solid product into smaller pieces vi) contacting the solid product with an organic liquid wherein the organic liquid is chosen to be a good solvent for the second polymer and a poor solvent for the polypropylene polymer whereby a dispersion comprising polypropylene particles in a solution of the second polymer dissolved in the organic liquid is formed.

The rate of cooling the reaction mixture should be as high as possible.

Preferably at least 50° C./minute, more preferably 50 to 6000° C./minute, even more preferably from 75° C./minute to 6000° C./minute, yet more preferably from 100° C./minute to 6000° C./minute.

Preferably the reaction mixture exits the extruder at from 100 to 230° C., more preferably from 130 to 200° C., even more preferably from 140 to 190° C. and most preferably from 150 to 180° C.

Preferably, in step iv), the reaction mixture is extruded from the exit of the extruder into a cooling liquid, preferably at a temperature below ambient temperature. Such a cooling liquid must not dissolve any of the components of the reaction mixture or product.

Preferably, the initial temperature, that is before the extrudate enters, of the cooling liquid should be as low as possible in order to cool the reaction mixture as rapidly as possible. In the case of water, the initial temperature is preferably from 5 to 20° C., more preferably from 10 to 17° C., even more preferably from 12 to 17° C. and most preferably from 13 to 17° C.

Particularly useful polypropylene polymers include propylene-maleic anhydride polymers, also known as maleinised polypropylene; and propylene-ethylene-maleic anhydride polymers.

Preferably the polypropylene polymer has a weight average molecular weight (Mw) of from 30,000 Daltons to 200,000 Daltons, more preferably from 40,000 to 150,000 Daltons, even more preferably from 45,000 to 130,000 Daltons and most preferably from 45,000 to 100,000 Daltons. Below about 30,000 Daltons the polymer has low mechanical strength and the seal formed is weak, resulting in an increased risk of seal failure occurring. Above about 200,000, the polypropylene becomes difficult to process easily due to high melt viscosity, even in the very high shear conditions prevailing in an extruder.

The polypropylene polymer carries sufficient carboxylic acid groups or carboxylic acid anhydride groups to give an acid value (AV) of from 2 to 50 mg KOH/g of non-vol polymer, preferably from 2 to 20 mg KOH/g and most preferably from 2 to 9 mg KOH/g. Below 2 mg KOH/g the quality of the dispersion is poor in that the particle size is coarse and the dispersion unstable, forming a sediment that cannot be easily redispersed. In addition, the adhesion to metal at such low AV is poor.

It is likely that at acid values of 2 to 50 mg KOH/g of polymer not all of the polypropylene polymer chains will carry carboxylic acid groups or carboxylic acid anhydride groups, especially at acid values below about 20 mg KOH/g. It is understood that such polymers will have a statistical mixture of polymers. It is thought that the portion of the polypropylene polymer that is free of carboxylic acid and carboxylic acid anhydride, being unreactive to the first polymer and insoluble in the organic liquid, will form the core portion of the microparticle. The reaction product forms the shell portion, surrounding the core acting as a stabiliser/dispersant for the microparticle.

Preferably the dispersion is free of added surfactant. By added is meant not formed in-situ.

The carboxylic acid anhydride groups are preferably unsaturated carboxylic acid anhydrides such as maleic anhydride. More preferably, the polypropylene polymer contains maleic anhydride in the polymer backbone.

When the dispersions of the invention are destined for uses which brings them into contact with food and beverages, it is preferable to keep the maleic anhydride level to 0.8% or below, calculated on the polypropylene copolymer. This equates to an AV of from 2 to 8 mg KOH/g polymer. This is compliant with the US Food and Drug Administration regulations.

The second polymer (also referred to herein as polymer 2) may be any polymer carrying functional groups capable of reacting with the carboxylic acid groups or carboxylic acid anhydride groups of the polypropylene polymer. More preferred are polymers useful in forming protective coatings for metal containers especially cans for food and beverages. Suitable examples include epoxy resins (that is, containing oxirane moieties), especially diepoxy resins, preferably derived from bis phenol A diglycidyl ether (often referred to as BADGE); phenoxy resins, epoxidised oils and polymers such as epoxidised soya bean oil or epoxidised polybutadiene; and polyester resins, alkyd resins, acrylic resins especially acrylic resins containing glycidyl methacrylate monomer and polyurethane resins. Of the epoxy resins based on BADGE the most preferred are epoxy resins of EEW from 450 to 6500. The preferred EEW for the acrylic resins containing glycidyl methacrylate is also from 450 to 6500.

Where polymer 2 is an epoxy resin, crosslinking can be effected by acid catalysis of the oxirane moieties themselves to produce a self-crosslinking coating. In such circumstances external crosslinkers are not required.

Preferably, the microparticles are free of butene polymer.

Suitable examples of functional groups on the second polymer include oxirane, hydroxyl, amine and isocyanate. Oxirane and hydroxyl are preferred as these are suitable for use in coatings in contact with food and beverages.

Additional polymers may be included. In a second aspect of the invention, a third polymer is included in the mixture of step i). Generally, such a polymer is chosen to modify a coating property such as adhesion, slip or hardness or to modify the seal strength of a heat sealable composition based on the resulting dispersion.

The functional groups of the second polymer are in molar excess over the carboxylic acid and/or carboxylic acid anhydride groups of the polypropylene polymer so that, preferably, at least some of the functional groups of the second polymer are available to react with crosslinking resins. Even more preferably there is a molar excess of second polymer over the polypropylene polymer. Yet more preferably the excess of second polymer is dissolved in the organic liquid.

Suitable crosslinking resins must be selected according to the functional groups on either or both of the first and second polymer. Suitable crosslinking resins include amino resins such as melamine-formaldehyde resins, urea-formaldehyde resins, phenol formaldehyde resin, benzoguanamine resins; acid functional resins such as polyesters—for example selected from the Uralac P range available from DSM Resins BV, acrylics of acid value greater than 30 mg KOH/g—for example selected from the Elvacite range available from Lucite International; anhydrides, for example trimellitic anhydride and pyromellitic dianhydride; blocked and unblocked isocyanates such as those based on isoperone diisocyanate, toluene diisocyanate and methane diphenyl diisocyanate available from Bayer; polyphenols and polyamines. Preferred crosslinking resins are capable of reacting with the first polymer. Suitable examples of crosslinking resins include Cymel 303, Phenodur 285.

It is thought that at least some of the carboxylic acid groups and/or carboxylic acid anhydride groups react with the functional groups of the second polymer to form, in situ, a dispersant capable of dispersing the copolymer microparticles. For example, where the second polymer is an epoxy resin, the carboxylic acid groups and/or carboxylic acid anhydride groups from the polypropylene polymer react with the hydroxyl groups and/or the oxirane groups of the epoxy resin to form an ester which acts to stabilise the particles. In this way dispersions can be made which are free of added dispersant. Preferably, all of the carboxylic acid/or carboxylic acid anhydride groups react with the functional groups on the second polymer.

It is thought that the particles have a core-shell type structure with the core being composed predominantly of polypropylene carrying no carboxylic acid or carboxylic acid anhydride groups, whilst the shell, which surrounds the core, is predominantly composed of the stabiliser/dispersant formed by the reaction of the second polymer with the polypropylene having carboxylic acid or carboxylic acid anhydride groups. Most of the second polymer is thought to be dissolved in the organic liquid forming the continuous phase of the dispersion.

The mean particle size of the dispersions of the invention are preferably less than 5 μm more preferably less than 2 μm. This ensures that the storage stability of the dispersions is good and any filtration losses during manufacture are minimised.

Other coreactive polymer combinations may be used in the invention.

Alternatives to the polypropylene first polymer include polyamide, polyester and acid functional polyolefin polymers. Preferably they are semi-crystalline.

In another aspect of the invention there is provided a dispersion of polymer particles produced by the process of the invention.

In a further aspect of the invention there is provided a coating composition comprising a dispersion of the invention and optionally a crosslinker.

In a still further aspect of the invention there is provided an article coated with a coating composition of the invention. Preferably, the coating is crosslinked.

The invention will now be illustrated by the following examples.

EXAMPLE 1

A twin screw extruder (Leistritz micro 18 GL 40 D available from Leistritz Aktiengesellschaft, Nurenberg)) was used having two screws rotating in the same direction at a speed of 200 rpm. The extruder barrel was divided into three zones with, in sequence, a feed zone maintained at ambient temperature of about 22° C., a melt blending/reaction zone at 230° C. and downstream of which was a cooling zone maintained at 170° C.

The screw profile in the feed zone consisted of conveying screw elements. In the melt blending/reaction zone the screw profile consisted of kneading screw elements and conveying screw elements. In the cooling zone the screw profile consisted of conveying screw elements alone.

A mixture of 80 parts by weight epoxy (DER 669-20) and 20 parts maleinsed polypropylene (FusaBond M613-05) was metered into the intake of the feed zone of the extruder at a rate 5.0 kg/hour. The mixture was conveyed to the melt blending/reaction zone where it melted and was formed into an intimate mixture under the high shear conditions of the extruder. The resulting melt blend then passed to the cooling zone and exited the extruder. The product was collected in a receiving vessel (5 litres) containing 3 litres of cold water at 15° C. The product was collected over a 5 minute period. Afterwards the product was dried at 60° C. for 15 minutes and ground using a coffee grinder.

The solid product was dispersed in Dowanol DPM at 35 wt % theoretical solids by slowly adding ground product to heated Dowanol DPM solvent in a stirred glass container at 80 deg C. All dispersions were filtered through muslin. The particle size distribution for the dispersions was determined using a Malvern Mastersizer S instrument.

COMPARATIVE EXAMPLE A

For the comparative example the above procedure using the same ingredients was repeated but the product was collected in vessel without any water and so the product did not receive the rapid forced cooling of Example 1.

Table 1 shows the particle size data measured using a Malvern Mastersizer S instrument.

TABLE 1

| Dispersion reference | Particles size (µm) | | |
|---|---|---|---|
| | D50 | D90 | D100 |
| Example 1 | 1.1 | 1.6 | 2.5 |
| Comparative Example 1 | 1.1 | 157.2 | 443 |

It is clear from the data in Table 1 that whilst both processes produce similar average particle size value (the D50 value) of 1.1 µm, the D90 (ie 90% of the particles are less than this diameter) and D100 (ie 100% of the particles are less than this diameter) values are considerably different. Large D90 or D100 values means presence of large particles that would have to be removed by filtration (causing processing issues and waste generation) and/or the subsequent coating appearance would be compromised (non-uniform coatings).

EXAMPLE 2

The same method as for Example 1 was used other than for the following changes:

Extruder was a Leistritz 40 mm 48L/D twin-screw extruder.

Screw Speed was 500 rpm

The epoxy to maleinised Polypropylene ratio was same but feed rate was 20 kg/hr. The collection vessel was a 205l steel drum containing 100l of water at 15° C. and collection time was 15 mins. The collected dispersion was converted into a dispersion using same method as in Example 1.

COMPARATIVE EXAMPLE 2

The following procedure and ingredients was used:

A twin screw extruder (Leistritz 40 GL 48 D available from Leistritz Aktiengesellschaft, Nurenberg)) was used having two screws rotating in the same direction at a speed of 500 rpm. The extruder barrel was divided into four zones with, in sequence, a feed zone maintained at ambient temperature of about 22° C., a melt blending/reaction zone at 230° C. and a dilution zone maintained at 170° C., downstream of which was a cooling zone maintained at 150° C.

The screw profile in the feed zone consisted of conveying screw elements. In the melt blending/reaction zone and the dilution zone, the screw profile consisted of kneading screw elements and conveying screw elements. In the cooling zone the screw profile consisted of conveying screw elements alone.

A mixture of 80 parts by weight epoxy (DER 669-20) and 20 parts maleinsed polypropylene (FusaBond M613-05) was metered into the intake of the feed zone of the extruder at a rate 20 kg/hour. The mixture was conveyed to the melt blending/reaction zone where it melted and was formed into an intimate mixture under the high shear conditions of the extruder. Downstream of the melt blending/reaction zone, in the dilution zone, an organic liquid, Dowanol DPM was metered in at a rate of 35 kg/hour causing the molten epoxy resin to dissolve in the liquid. The resulting composition then passed to the cooling zone in which the PP particles formed after which the final dispersion exited at 120° C. and was collected in a receiving vessel.

Both dispersions were filtered through muslin and particle size distribution was determined and results are given Table 2.

TABLE 2

| Dispersion reference | Particles size (µm) | | |
|---|---|---|---|
| | D50 | D90 | D100 |
| Example 2 | 0.6 | 1.2 | 9.8, |
| Comparative Example 2 | 2.8 | 9.8 | 18.0 |

From the data in Table 2 it is clear that the method used to prepare the dispersion of Example 2 provides both a smaller particle size, 0.6 µm compared to 2.8 µm, and also a much narrower particle size distribution with consequentially fewer very large particles.

EXAMPLES 3 TO 12

Examples 3 to 10 use the method and ingredients described below to make the solid product and dispersions derived from the products.

The method used to prepare the solid product was as in Example 1 except that the screw speed was 200 rpm and solid feed consisted of 1 part of maleinised polypropylene (Fusa-Bond M613-05) and 2 parts resin and fed at a rate of 1.5 kg/hr into the extruder. The solid products were collected into water at 15° C. The solid products were converted into dispersions by taking 3 grams of dry solid products and 27 grams of Dowanol DPM and placing them in lidded glass jars. The glass jars were then placed in an ultrasonic water bath at 75° C. The action of heat and ultrasound caused the resin to dissolve to produce a dispersion of PP in the resin solution. The particle size distribution was measured using a Malvern Mastersizer S instrument as before.

For Examples 11 and 12 the same method as above was used other than for the following changes:
1 part of maleinised polypropylene to 4 parts resin,
the melt blending/reaction zone was 260° C. instead of 230° C. and
the solvent used to make the dispersion was a 3:1 mixture of propylene glycol methyl ether acetate and Solvesso 100.

Table 3 summarises the ingredients and the processing conditions used and the mean particle size distributions.

The Elvacite 4400 resin is methacrylate copolymer with hydroxyl functionality supplied by Lucite International.

Elvacite EDP Resins A to E are methacrylate copolymers with hydroxyl and/or gylcidyl functionalities (given in Table 3) and have a glass transition temperature around 50° C. and molecular weight around 15 000 Daltons. These copolymers are also available from Lucite International.

Eastman CAB-551 is a cellulose acetate butyrate resin supplied by Eastman Chemical Company.

Dynapol L205 and Dynapol L651 are saturated polyesters available from Evonik Industries.

Butylated Phenolic resin FRJ 551H is a heat reactive resin supplied by SI Group Incorporated.

Dowanol DPM and propylene glycol methyl ether acetate are available from Dow Chemical Company.

Solvesso 100 is available from the ExxonMobil Chemical Company.

It can be seen that when the second polymer (polymer 2) is epoxy functional, the particle size of the dispersion decreases as the Epoxy Equivalent Weight (EEW) reduces.

There is little effect of varying the hydroxyl values between 50 to 95 mg KOH/g polymer 2.

TABLE 3

| Example | Polymer 2 | Hydoxyl Value of polymer 2 (mgKOH/1 g of polymer 2) | Epoxy Equivalent Weight (EEW) of polymer 2 | Extrusion Melt Temperature (° C.) | Extrusion Melt blending Temperature (° C.) | Reaction Mixture exit Temperature (° C.) | Average Particle size of dispersion (μm) |
|---|---|---|---|---|---|---|---|
| 3 | Elvacite 4400 | 95 | 0 | 200 | 170 | 170 | 6.0 |
| 4 | Elvacite EDP Resin A | 55 | 0 | 200 | 170 | 170 | 6.0 |
| 5 | Elvacite EDP Resin B | 55 | 5680 | 200 | 170 | 170 | 1.9 |
| 6 | Elvacite EDP Resin C | 55 | 2840 | 200 | 170 | 170 | 1.1 |
| 7 | Elvacite EDP Resin D | 55 | 2130 | 200 | 170 | 170 | 1.0 |
| 8 | Elvacite EDP Resin E | 0 | 2840 | 200 | 170 | 170 | 1.3 |
| 9 | Eastman CAB-551 | 50 | 0 | 200 | 170 | 170 | 6.0 |
| 10 | Phenolic Resin FRJ 551H | Not determined | 0 | 165 | 150 | 150 | 3.0 |
| 11 | Dynapol L205 | 10 | 0 | 260 | 170 | 170 | 6.7 |
| 12 | Dynapol L651 | 5 | 0 | 260 | 170 | 170 | 3.4 |

All of the examples were free of particles of mean particle diameter greater than 20 μm

COATING EXAMPLES

Coating Examples 1-5

Some of the solid products of table 3 were converted into high solids dispersions and then coatings according to the following procedure.

10 grams of solid product (or polymer 2 by itself) and 20 grams of Dowanol DPM were placed in lidded glass jars and the jars were then placed in an ultrasonic water bath at 75° C. for one hour. The dispersion was cooled to room temperature and 7 grams of Phenolic FRJ 551 resin solution in Dowanol DPM (30 wt % solids) was added along with 3 drops of phosphoric acid (SG of 1.75) as catalyst. The resulting formulations were applied using K-Bar number 28 onto ETP steel plates and stoved at 200° C. for 10 minutes.

Coating Example 6

The same procedure as for examples 1-5 above other than no Phenoloic FRJ 551 crosslinker resin was added and 0.4 grams of phosphoric acid was added The resulting coatings were subjected to a wedge bend test and the results are summarised in Table 4.

| Coating Example | Polymer 2 | % Wedge Bend Pass for resin formulation only | % Wedge Bend Pass for Resin/PP formulation |
|---|---|---|---|
| 1 | Elvacite 4400 | 70 | 85 |
| 2 | Elvacite EDP Resin B | 65 | 85 |

-continued

| Coating Example | Polymer 2 | % Wedge Bend Pass for resin formulation only | % Wedge Bend Pass for Resin/ PP formulation |
|---|---|---|---|
| 3 | Elvacite EDP Resin C | 70 | 90 |
| 4 | Elvacite EDP Resin D | 70 | 95 |
| 5 | Eastman CAB 551 | 60 | 85 |
| 6* | Elvacite EDP Resin C | 0-10 | 80-90 |

*Crosslinker-free
All Coating Examples had acceptable cure as measured by solvent rubs.

The invention claimed is:

1. A process for the manufacture of a polymer dispersion comprising the steps of
   i) providing a mixture comprising from 2 to 60 parts by weight of a first polypropylene polymer having sufficient carboxylic acid and/or carboxylic acid anhydride groups equivalent to an acid value of from 2 to 50 mg KOH/g nv polymer, and from 40 to 98 parts by weight of a second polymer having a molar excess of functional groups capable of reacting with the carboxylic acid and/or carboxylic acid anhydride groups of the polypropylene;
   ii) causing the polymers to melt at a chosen temperature under conditions of high shear in an extruder to form an intimate mixture of the polymers;
   iii) causing some of the carboxylic acid and/or carboxylic acid anhydride groups of the polypropylene to react with at least some of the functional groups of the second polymer to form a reaction mixture, under conditions of high shear in an extruder;
   iv) rapidly cooling the reaction mixture outside the extruder to form a solid product; and
   v) contacting the solid product with an organic liquid;
   wherein the organic liquid is chosen to be a good solvent for the second polymer and a poor solvent for the polypropylene polymer whereby a dispersion comprising polypropylene particles in a solution of the second polymer dissolved in the organic liquid is formed.

2. The process according to claim 1 wherein the rapid cooling of step iv) is performed by extruding the reaction mixture from an exit of the extruder into a cooling liquid.

3. The process according to claim 2 wherein the cooling liquid is water.

4. The process according to claim 1 wherein the weight average molecular weight of the polypropylene polymer is from 30000 Daltons to 200000 Daltons.

5. The process according to claim 1 wherein the second polymer is selected from the group consisting of epoxy resins derived from bis phenol A diglycidyl ether; phenoxy resins; and resins comprising glycidyl methacrylate.

6. The process according to claim 5 wherein the epoxy equivalent weight of the resins is from 450 to 6500.

7. A dispersion of polymer particles produced by the process of claim 1.

8. A coating composition comprising the dispersion according to claim 7.

9. The coating composition according to claim 8 further comprising a crosslinking resin.

10. An article coated with the coating composition according to claim 8.

11. An article coated with the coating composition according to claim 9.

12. The process according to claim 1, further comprising breaking up the solid product into smaller pieces.

13. The process according to claim 2 wherein the weight average molecular weight of the polypropylene polymer is from 30000 Daltons to 200000 Daltons.

14. The process according to claim 3 wherein the weight average molecular weight of the polypropylene polymer is from 30000 Daltons to 200000 Daltons.

15. The process according to claim 12 wherein the weight average molecular weight of the polypropylene polymer is from 30000 Daltons to 200000 Daltons.

16. The process according to claim 2 wherein the second polymer is selected from the group consisting of epoxy resins derived from bis phenol A diglycidyl ether; phenoxy resins; and resins comprising glycidyl methacrylate.

17. The process according to claim 3 wherein the second polymer is selected from the group consisting of epoxy resins derived from bis phenol A diglycidyl ether; phenoxy resins; and resins comprising glycidyl methacrylate.

18. The process according to claim 4 wherein the second polymer is selected from the group consisting of epoxy resins derived from bis phenol A diglycidyl ether; phenoxy resins; and resins comprising glycidyl methacrylate.

19. The process according to claim 12 wherein the second polymer is selected from the group consisting of epoxy resins derived from bis phenol A diglycidyl ether; phenoxy resins; and resins comprising glycidyl methacrylate.

20. The process according to claim 19 wherein the epoxy equivalent weight of the resins is from 450 to 6500.

* * * * *